(12) United States Patent
Chung et al.

(10) Patent No.: US 8,951,655 B2
(45) Date of Patent: *Feb. 10, 2015

(54) MIDDLE OR LARGE-SIZED BATTERY PACK CASE PROVIDING IMPROVED DISTRIBUTION UNIFORMITY IN COOLANT FLUX

(75) Inventors: Chae Ho Chung, Daejeon (KR); Ye Hoon Im, Daejeon (KR); Dal Mo Kang, Daejeon (KR); Jongmoon Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 235 days.

This patent is subject to a terminal disclaimer.

(21) Appl. No.: 13/203,246

(22) PCT Filed: Feb. 25, 2010

(86) PCT No.: PCT/KR2010/001184
§ 371 (c)(1),
(2), (4) Date: Dec. 21, 2011

(87) PCT Pub. No.: WO2010/098598
PCT Pub. Date: Sep. 2, 2010

(65) Prior Publication Data
US 2012/0088131 A1    Apr. 12, 2012

(30) Foreign Application Priority Data

Feb. 27, 2009  (KR) .................... 10-2009-0016620

(51) Int. Cl.
| | | |
|---|---|---|
| *H01M 2/36* | (2006.01) | |
| *H01M 10/50* | (2006.01) | |
| *H01M 2/10* | (2006.01) | |
| *H01M 10/613* | (2014.01) | |
| *H01M 10/617* | (2014.01) | |
| *H01M 10/647* | (2014.01) | |

(Continued)

(52) U.S. Cl.
CPC ........ *H01M 2/1077* (2013.01); *H01M 10/5004* (2013.01); *H01M 10/5008* (2013.01);

(Continued)

(58) Field of Classification Search
CPC ........ H01M 2/00; H01M 2/077; H01M 10/50
USPC .......................................... 429/120
See application file for complete search history.

(56) References Cited

U.S. PATENT DOCUMENTS

| | | | | |
|---|---|---|---|---|
| 6,482,542 | B1 * | 11/2002 | Takaki et al. .................. | 429/120 |
| 8,298,698 | B2 * | 10/2012 | Chung et al. .................. | 429/120 |

(Continued)

FOREIGN PATENT DOCUMENTS

| | | |
|---|---|---|
| JP | 61-29077 A | 2/1986 |
| JP | 2005-116342 A | 4/2005 |

(Continued)

*Primary Examiner* — Ula C. Ruddock
*Assistant Examiner* — Lisa S Park Gehrke
(74) *Attorney, Agent, or Firm* — Birch, Stewart, Kolasch & Birch, LLP

(57) ABSTRACT

Disclosed herein is a middle or large-sized battery pack case in which a battery module having a plurality of stacked battery cells or unit modules ('unit cells'), which can be charged and discharged, is mounted, wherein the battery pack case is provided at an upper part and a lower part thereof with a coolant inlet port and a coolant outlet port, respectively, which are directed in opposite directions such that a coolant to cool the unit cells can flow from one side to the other side of the battery module in the direction perpendicular to the stacking direction of the unit cells, the battery pack case is further provided with a flow space ('coolant introduction part') extending from the coolant inlet port to the battery module and another flow space ('coolant discharge part') extending from the battery module to the coolant outlet port, an upper end inside of the coolant introduction part facing the top of the battery module is configured so that the distance between the upper end inside of the coolant introduction part and the top of the battery module decreases toward an end of the battery pack case opposite to the coolant inlet port, and a downwardly projected portion to guide the coolant to the battery module is formed at the upper end inside of the coolant introduction part so that the rugged portion extends a predetermined distance from the end of the battery pack case opposite to the coolant inlet port.

32 Claims, 20 Drawing Sheets

(51) Int. Cl.
 *H01M 10/652* (2014.01)
 *H01M 10/6557* (2014.01)
 *H01M 10/6561* (2014.01)

(52) U.S. Cl.
 CPC ...... *H01M10/5032* (2013.01); *H01M 10/5038* (2013.01); *H01M 10/5059* (2013.01); *H01M 10/5063* (2013.01)
 USPC .......................................... 429/72; 429/120

(56) References Cited

U.S. PATENT DOCUMENTS

2006/0093901 A1* 5/2006 Lee et al. ................ 429/120
2006/0214633 A1   9/2006 Cho
2006/0216579 A1* 9/2006 Cho ............................... 429/62
2007/0099061 A1   5/2007 Na et al.
2007/0102213 A1   5/2007 Seo et al.
2010/0203376 A1   8/2010 Choi et al.

FOREIGN PATENT DOCUMENTS

| | | |
|---|---|---|
| JP | 2006-286519 A | 10/2006 |
| JP | 2006-294336 A | 10/2006 |
| KR | 10-2001-0082060 A | 8/2001 |
| KR | 10-2006-0037600 A | 5/2006 |
| KR | 10-2006-0037601 A | 5/2006 |
| KR | 10-2006-0037627 A | 5/2006 |
| KR | 10-0870457 B1 | 11/2008 |
| KR | 10-0942985 B1 | 2/2010 |

* cited by examiner

MIDDLE OR LARGE-SIZED BATTERY PACK CASE PROVIDING IMPROVED DISTRIBUTION UNIFORMITY IN COOLANT FLUX

TECHNICAL FIELD

The present invention relates to a middle or large-sized battery pack case providing improved distribution uniformity in coolant flux, and, more particularly, to a middle or large-sized battery pack case in which a battery module having a plurality of stacked battery cells or unit modules ('unit cells'), which can be charged and discharged, is mounted, wherein the battery pack case is provided at an upper part and a lower part thereof with a coolant inlet port and a coolant outlet port, respectively, which are directed in opposite directions such that a coolant to cool the unit cells can flow from one side to the other side of the battery module in the direction perpendicular to the stacking direction of the unit cells, the battery pack case is further provided with a flow space ('coolant introduction part') extending from the coolant inlet port to the battery module and another flow space ('coolant discharge part') extending from the battery module to the coolant outlet port, an upper end inside of the coolant introduction part facing the top of the battery module is configured so that the distance between the upper end inside of the coolant introduction part and the top of the battery module decreases toward an end of the battery pack case opposite to the coolant inlet port, and a downwardly projected portion to guide the coolant to the battery module is formed at the upper end inside of the coolant introduction part so that the rugged portion extends a predetermined distance from the end of the battery pack case opposite to the coolant inlet port.

BACKGROUND ART

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle or large-sized devices, such as vehicles, use a middle or large-sized battery module having a plurality of battery cells electrically connected to each other because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently generated in the pouch-shaped battery, which uses an aluminum laminate sheet as a sheathing member, because the pouch-shaped battery is light-weight, the manufacturing cost of the pouch-shaped battery is low, and it is easy to modify the shape of the pouch-shaped battery.

In order for the middle or large-sized battery module to provide power and capacity required by a predetermined apparatus or device, it is necessary for the middle or large-sized battery module to be configured to have a structure in which a plurality of battery cells is electrically connected in series to each other, and the battery cells are stable against an external force.

Also, the battery cells constituting the middle or large-sized battery module are secondary batteries which can be charged and discharged. Consequently, a large amount of heat is generated from the high-power, large-capacity secondary batteries during the charge and discharge of the batteries. If the heat, generated from the unit cells during the charge and discharge of the unit cells, is not effectively removed, the heat accumulates in the respective unit cells with the result that the deterioration of the unit cells is accelerated. According to circumstances, the unit cells may catch fire or explode. For this reason, a cooling system is needed in a battery pack for vehicles, which is a high-power, large-capacity battery, to cool battery cells mounted in the battery pack.

In a middle or large-sized battery pack including a plurality of battery cells, on the other hand, the deterioration in performance of some battery cells leads to the deterioration in performance of the entire battery pack. One of the main factors causing the non-uniformity of the performance is the non-uniformity of cooling between the battery cells. For this reason, it is required to provide a structure to secure the uniformity of cooling during the flow of a coolant.

Some conventional middle or large-sized battery packs use a battery pack case configured to have a structure in which a coolant inlet port and a coolant outlet port are located at the upper part and the lower part of the battery pack case such that the coolant inlet port and a coolant outlet port are directed in opposite directions, and the top and bottom of a flow space extending from the coolant inlet port to the battery module are parallel to each other. In this structure, however, a relatively high coolant flux is introduced into flow channels defined between the battery cells adjacent to the coolant outlet port, whereas a relatively low coolant flux is introduced into flow channels defined between the battery cells adjacent to the coolant inlet port with the result that it is difficult to achieve uniform cooling of the battery cells.

In connection with this matter, Korean Patent Application Publication No. 2006-0037600, No. 2006-0037601, and No. 2006-0037627 disclose a middle or large-sized battery pack configured to have a structure in which an air guide plane is inclined downward to a side of a battery pack case opposite to battery cells so that the air guide plane becomes closer to the battery cells with the increase in distance between the air guide plane and a coolant inlet port. Specifically, the air guide plane is inclined at a predetermined angle, for example an angle of 15 to 45 degrees, to the side of the battery pack case opposite to the battery cells, thereby restraining the occurrence of a phenomenon in which a coolant is excessively introduced into flow channels defined between the battery cells adjacent to the coolant outlet port.

However, the inventors of the present application have found that the temperature deviation between the battery cells is high even in the above-described structure with the result that it is not possible to achieve temperature uniformity of a desired level.

Furthermore, in this structure, regions of the air guide plane adjacent to the battery cells may come into contact with the battery cells or the battery module during vibration of the battery pack with the result that noise may be generated from the battery pack or the battery pack may be damaged. Consequently, it is not possible to lower the end of the battery pack case opposite to the coolant inlet port below a predetermined height with the result that it is not possible to design a pack case having optimum temperature deviation.

Meanwhile, in connection with the structure of a conventional battery pack, FIG. 1 is a perspective view illustrating a middle or large-sized battery pack configured to have a structure in which a battery module is mounted in a conventional middle or large-sized battery pack case and FIG. 2 is a vertical sectional view typically illustrating the middle or large-sized battery pack having the battery module mounted in the middle or large-sized battery pack case of FIG. 1.

Referring to these drawings, a middle or large-sized battery pack 100 includes a battery module 32 configured to have a structure in which a plurality of unit cells 30 is stacked so that the unit cells 30 are electrically connected to each other, a battery pack case 70 in which the battery module 32 is mounted, a coolant introduction part 40, as a flow space, extending from a coolant inlet port 10 to the battery module 32 and a coolant discharge part 50, as another flow space, extending from the battery module 32 to a coolant outlet port 20.

A coolant, introduced through the coolant inlet port 10, flows through the coolant introduction part 40 and flow channels 60 defined between the respective unit cells 30. At this time, the coolant cools the battery cells 30. After that, the coolant flows through the coolant discharge part 50 and is then discharged out of the battery pack case through the coolant outlet port 20.

The coolant introduction part 40 is formed in parallel to the direction in which the unit cells 30 are stacked. In the above structure, a relatively high coolant flux is introduced into the flow channels defined between the unit cells adjacent to the coolant outlet port 20, whereas a relatively low coolant flux is introduced into the flow channels defined between the unit cells adjacent to the coolant inlet port 10, with the result that the cooling of the unit cells 30 is not uniformly achieved, and therefore, the temperature deviation between the unit cells adjacent to the coolant outlet port 20 and the unit cells adjacent to the coolant inlet port 10 is very high. This phenomenon occurs because the coolant concentrates on the coolant outlet port 20 side with the result that the temperature of the coolant inlet port 10 side increases.

Also, FIG. 3 is a vertical sectional view typically illustrating a middle or large-sized battery pack configured to have a structure in which a battery module is mounted in another conventional middle or large-sized battery pack case.

A middle or large-sized battery pack 100a of FIG. 3 is substantially identical to the middle or large-sized battery pack 100 of FIG. 1 in connection with the unit cells 30, the battery module 32, the coolant discharge part 50 and the flow channels 60. However, the middle or large-sized battery pack 100a of FIG. 3 is different from the middle or large-sized battery pack 100 of FIG. 1 in that a coolant inlet port 10a and a coolant introduction part 40a are inclined at a predetermined angle to a battery pack case 70a. That is, an upper end inside 42a of the coolant introduction part 40a is inclined at a predetermined angle toward an end of the battery pack case 70 opposite to the coolant inlet port 10a. Also, the end of the battery pack case 70 opposite to the coolant inlet port 10a is spaced apart from the top of the battery module 32 by a height H of approximately 1 mm so that the temperature of a coolant flowing between the unit cells 30 is uniform.

In this structure, the efficiency of cooling the unit cells 30 adjacent to the coolant inlet port 10a is relatively high as compared with the middle or large-sized battery pack 100 of FIG. 1. However, considerably high temperature difference still exists. In addition, the upper end inside of the coolant introduction part 40a comes into contact with the tops of the unit cells during vibration of the middle or large-sized battery pack 100a with the result that noise may be generated from the middle or large-sized battery pack or the middle or large-sized battery pack may be damaged.

Consequently, there is a high necessity for a technology to fundamentally solve the above-mentioned problems.

DISCLOSURE

Technical Problem

Therefore, the present invention has been made to solve the above problems, and other technical problems that have yet to be resolved.

As a result of a variety of extensive and intensive studies and experiments on a middle or large-sized battery pack case, the inventors of the present application have found that, when the middle or large-sized battery pack case is configured to have a structure in which a downwardly projected portion to guide a coolant to a battery module is formed at an upper end inside of a coolant introduction part adjacent to an end of the battery pack case opposite to a coolant inlet port, it is possible to uniformly distribute the coolant flowing in flow channels defined between battery cells while maintaining the end of the battery pack case opposite to the coolant inlet port to a proper height or higher, thereby effectively removing heat accumulating between the battery cells and greatly improving the performance and life span of the battery cells. The present invention has been completed based on these findings.

Technical Solution

In accordance with one aspect of the present invention, the above and other objects can be accomplished by the provision of a middle or large-sized battery pack case in which a battery module having a plurality of stacked battery cells or unit modules ('unit cells'), which can be charged and discharged, is mounted, wherein the battery pack case is provided at an upper part and a lower part thereof with a coolant inlet port and a coolant outlet port, respectively, which are directed in opposite directions such that a coolant to cool the unit cells can flow from one side to the other side of the battery module in the direction perpendicular to the stacking direction of the unit cells, the battery pack case is further provided with a flow space ('coolant introduction part') extending from the coolant inlet port to the battery module and another flow space ('coolant discharge part') extending from the battery module to the coolant outlet port, an upper end inside of the coolant introduction part facing the top of the battery module is configured so that the distance between the upper end inside of the coolant introduction part and the top of the battery module decreases toward an end of the battery pack case opposite to the coolant inlet port, and a downwardly projected portion to guide the coolant to the battery module is formed at the upper end inside of the coolant introduction part so that the rugged portion extends a predetermined distance from the end of the battery pack case opposite to the coolant inlet port.

That is, in the middle or large-sized battery pack case according to the present invention, the downwardly projected portion to guide the coolant to the battery module is formed at the upper end inside of the coolant introduction part adjacent to the end of the battery pack case opposite to the coolant inlet port, and therefore, it is possible to uniformly distribute the flux of a coolant flowing in the flow channels defined between the unit cells (battery cells or unit module) while maintaining the end of the battery pack case opposite to the coolant inlet port to a proper height or higher from the top of the battery module, thereby effectively removing heat generated from the battery cells during charge and discharge of the battery cells by uniform flow of the coolant. Consequently, it is possible to cooling efficiency and improving operating performance of the unit cells.

Also, the end of the battery pack case opposite to the coolant inlet port is maintained at the proper height or higher by the downwardly projected portion. Consequently, it is possible to prevent the battery pack from generating noise or being damaged due to the collision between the end of the battery pack case opposite to the coolant inlet port and the unit cells during vibration of the battery pack.

The battery module mounted in the middle or large-sized battery pack case according to the present invention is manufactured by stacking a plurality of unit cells with high integration. The unit cells are stacked so that the unit cells are spaced apart from each other by a predetermined distance to remove heat generated from the unit cells during charge and discharge of the unit cells. For example, the battery cells are sequentially stacked so that the battery cells are spaced apart from each other by a predetermined distance without using additional members. For battery cells having a low mechanical strength, on the other hand, one or more battery cells are mounted in a mounting member and a plurality of mounting members are stacked to constitute a battery module. In the present invention, the latter is referred to as a 'unit module.' In a case in which a plurality of unit modules is stacked to constitute a battery module, coolant flow channels are formed between the battery cells and/or between the unit modules to effectively remove heat accumulating between the stacked battery cells.

The coolant introduction part and the coolant discharge part are flow spaces through which a coolant to effectively remove heat generated from the battery cells during charge and discharge of the battery cells is introduced and discharged. The coolant introduction part and the coolant discharge part are formed at the upper part and the lower part of the battery pack case in opposite directions, respectively. According to circumstances, the coolant introduction part and the coolant discharge part may be formed at the lower part and the upper part of the battery pack case, respectively.

In a preferred example, the downwardly projected portion may include a rugged portion to eddy the coolant.

In this case, the rugged portion has a height equivalent to 10 to 50% of that of the end of the battery pack case opposite to the coolant inlet port. If the height of the rugged portion is greater than 50% of that of the end of the battery pack case opposite to the coolant inlet port, flow resistance excessively increases, which is not preferable. On the other hand, if the height of the rugged portion is less than 10% of that of the end of the battery pack case opposite to the coolant inlet port, it is not possible to eddy the coolant, which is not preferable.

The rugged portion may have lowest points, each of which is located above the center, the front side or the rear side of the top of a corresponding one of the unit cells. Preferably, the rugged portion has lowest points, each of which is located above the front side of the top of a corresponding one of the unit cells since the coolant passing above the unit cells is prevented from concentrating on the rear side of each of the unit cells, thereby improving distribution uniformity of the coolant.

The rugged portion may be formed in the shape of downwardly protruding or depressed beads or hemispheres. Preferably, the rugged portion includes downward depressions.

In another preferred example, the downwardly projected portion may include partitions. Distribution uniformity of the coolant is improved as compared with a conventional battery pack case having no partitions.

According to circumstances, the downwardly projected portion may include downward protrusions arranged discontinuously in the lateral direction of the coolant introduction part and arranged alternately in the longitudinal direction of the coolant introduction part.

The length of the downwardly projected portion is not particularly restricted so long as the downwardly projected portion easily guide the coolant. For example, the downwardly projected portion may extend a distance equivalent to 5 to 100%, preferably 20 to 100%, of the length of the top of the battery module from the end of the battery pack case opposite to the coolant inlet port.

In a preferred example, the upper end inside of the coolant introduction part may be configured to have a structure in which the inclination of an incline plane starting from the end of the battery pack case opposite to the coolant inlet port increases toward the coolant inlet port from the top of the battery module.

Here, the expression 'the increase of the inclination' means that the incline plane located at the coolant inlet port side has an inclination greater than that of the incline plane located at the side opposite to the coolant inlet port. Consequently, the incline plane may increase continuously or discontinuously toward the coolant inlet port. Here, the expression 'the discontinuous increase' means that a region defined between the incline planes may have an inclination of 0 degrees. For example, a region having an inclination of 0 degrees with respect to the top of the cell stack may be partially formed between the neighboring incline planes.

The inclination of the incline plane of the upper end inside of the coolant introduction part may increase toward the coolant inlet port in various structures.

In a preferred example, the upper end inside of the coolant introduction part may include two or more continuous incline planes. That is, incline planes, the inclination of which increases toward the coolant inlet port from the end of the battery pack case opposite to the coolant inlet port, may be formed at the upper end inside of the coolant introduction part.

The experiments carried out by the inventors of the present application revealed that, when the upper end inside of the coolant introduction part was configured to have a structure including two or more incline planes than when the upper end inside of the coolant introduction part was parallel to the top of the battery module or when the upper end inside of the coolant introduction part was configured to have a structure including a single incline plane, temperature deviation between the unit cells decreased, and therefore, the performance of the unit cells was further improved.

In a concrete example, the incline planes of the upper end inside may include a first incline plane starting from the end of the battery pack case opposite to the coolant inlet port and a second incline plane located between the first incline plane and the coolant inlet port so that the second incline plane has an inclination greater than that of the first incline plane.

In the above structure, the downwardly projected portion may be formed wholly or partially at the first incline plane as needed. Preferably, the downwardly projected portion is formed wholly at the first incline plane since it is possible to secure overall distribution uniformity of the coolant.

In another concrete example, the incline planes of the upper end inside may include a first parallel plane extending from the end of the battery pack case opposite to the coolant inlet port so that the first parallel plane is parallel to the top of the battery module, a first incline plane starting from the first parallel plane and a second incline plane located between the first incline plane and the coolant inlet port so that the second incline plane has an inclination greater than that of the first incline plane.

In the above structure, the downwardly projected portion may be formed wholly or partially at the first parallel plane as needed. Preferably, the downwardly projected portion is formed wholly at the first parallel plane since it is possible to secure overall distribution uniformity of the coolant.

In the above illustrative structures, the second incline plane has an inclination 20 to 500%, preferably 100 to 300%, greater than the inclination of the first incline plane within a range in which the inclination of the second incline plane does not exceed 45 degrees to the top of the battery module. Since the inclination of the second incline plane does not exceed 45 degrees, it is possible to minimize the increase in size of the battery pack case. Also, since the inclination of the second incline plane is at least 20% greater than that of the first incline plane, it is possible to secure desirable distribution uniformity of the coolant flux.

The first incline plane may have an inclination of 15 degrees or less with respect to the top of the battery module. Preferably, the first incline plane has an inclination of 2 to 7 degrees with respect to the top of the battery module. More preferably, the first incline plane has an inclination of 3 to 5 degrees with respect to the top of the battery module.

In this case, the second incline plane may have an inclination of 10 to 30 degrees or less with respect to the top of the battery module within a range in which the inclination of the second incline plane is not greater than that of the first incline plane.

Meanwhile, the coolant inlet port may have various inclinations depending upon conditions of a device in which the middle or large-sized battery pack is mounted. For example, the coolant inlet port may have an inclination equal to or less than that of the second incline plane.

According to circumstances, when the inclination of the coolant inlet port is required to be large due to the structural limit of the device in which the middle or large-sized battery pack is mounted, the coolant inlet port may have an inclination equal to or greater than that of the second incline plane.

The inventors of the present application experimentally confirmed that, when the upper end inside of the coolant introduction part was configured to have a specific inclined structure as previously defined, the influence of the inclination of the coolant inlet port on the uniformity of the coolant flux in the coolant flow channels was insignificant. Therefore, when the upper end inside of the coolant introduction part is configured to have a specific inclined structure as in the present invention, it is possible to freely decide the inclination of the coolant inlet port depending upon the installation conditions of a device.

In a preferred example, the coolant inlet port may have an inclination of 30 to 60 degrees with respect to the top of the cell stack within a range in which the coolant inlet port has an inclination exceeding that of the second incline plane. Consequently, even when the inclination of the coolant inlet port is required to be large depending upon the conditions of a device in which the battery pack is mounted, it is possible to effectively achieve desired cooling efficiency by the provision of the characteristic structure of the upper end inside of the coolant introduction part.

Meanwhile, the end of the battery pack case opposite to the coolant inlet port may be spaced apart from the top of the battery module by a height equivalent to 2 to 30% of that of the battery module. This structure appropriately restricts the amount of the coolant reaching to the end of the battery pack case opposite to the coolant inlet port, thereby further improving a uniform distribution effect of the coolant with respect to the unit cells.

In this case, the end of the battery pack case opposite to the coolant inlet port is spaced apart from the top of the battery module by a height of preferably 3 to 20 mm, more preferably approximately 5 mm.

Since the downwardly projected portion eddies the coolant even in a case in which the end of the battery pack case opposite to the coolant inlet port is spaced apart from the top of the battery module by approximately 5 mm, therefore, it is possible to secure uniform cooling efficiency provided by the structure in which the downwardly projected portion eddies the coolant even in a case in which the end of the battery pack case opposite to the coolant inlet port is spaced apart from the top of the battery module by approximately 1 mm and to prevent the top of the battery module from being damaged by impact generated during vibration of the batter pack.

The battery cells may be secondary batteries, such as nickel metal hydride secondary batteries or lithium secondary batteries. Among them, the lithium secondary batteries are preferably used because the lithium secondary batteries have high energy density and high discharge voltage. Based on its shape, a prismatic battery, a pouch-shaped battery or a cylindrical battery is preferably used as a chargeable and dischargeable unit cell constituting the battery module. More preferably, the pouch-shaped battery is used as the unit cell of the battery module because the pouch-shaped battery is manufactured with low manufacturing cost and light in weight.

Also, the battery pack case according to the present invention is more preferable in a structure in which the cooling efficiency is serious, i.e., a structure in which the length of the battery pack case corresponding to the stacking direction of the battery cells is greater than that of the battery pack case corresponding to the lateral direction of the battery cells.

Meanwhile, the coolant discharge part may have a uniform height with respect to the bottom of the battery module. That is, the coolant discharge part may be configured to have a structure in which a lower end inside part of the coolant discharge part has a uniform height with respect to the bottom of the cell stack. Of course, however, the structure may be partially modified to improve the coolant discharge efficiency.

According to circumstances, the battery pack case may be configured to have a structure in which a blowing fan is further mounted in the coolant outlet port or the coolant outlet port to rapidly and smoothly move the coolant, introduced through the coolant inlet port, to the coolant outlet port, after the coolant flows through the battery module. In this structure, the coolant, introduced through the narrow coolant inlet port, sufficiently reaches the battery cells distant from the coolant inlet port at a high flow speed of the coolant by coolant driving force generated from the blowing fan, and therefore, the relatively uniform distribution of the coolant flux is achieved in the condition of the same coolant flux.

In accordance with another aspect of the present invention, there is provided a middle or large-sized battery pack configured to have a structure in which a battery module is mounted in the middle or large-sized battery pack case with the above-stated construction.

The term 'battery module' used in the specification inclusively means the structure of a battery system configured to have a structure in which two or more chargeable and dischargeable battery cells or unit modules are mechanically coupled and, at the same time, electrically connected to each other to provide high-power, large-capacity electricity.

Therefore, the battery module itself may constitute a single apparatus or a part of the large-sized apparatus. For example, a plurality of small-sized battery modules may be connected to each other to constitute a large-sized battery module. Alternatively, a small number of battery cells may be connected to each other to constitute a unit module, and a plurality of the unit modules may be connected to each other.

Meanwhile, the unit module may be configured in various structures, an exemplary example of which will be described hereinafter.

The unit module is configured to have a structure in which a plurality of plate-shaped battery cells, each of which has electrode terminals formed at the upper and lower ends thereof, are connected in series to each other. Specifically, the unit module may includes two or more battery cells arranged in a stacked structure in which connections between the electrode terminals of the battery cells are bent and a high-strength cell cover coupled to the battery cells to cover the outer surfaces of the battery cells excluding the electrode terminals of the battery cells.

The plate-shaped battery cells are battery cells having a small thickness and relatively large width and length to minimize the entire size of the battery cells when the battery cells are stacked to constitute a battery module. As a preferred example, the battery cell may be a secondary battery configured to have a structure in which an electrode assembly is mounted in a battery case formed of a laminate sheet including a resin layer and a metal layer, and electrode terminals protrude outward from the upper and lower ends of the battery case. Specifically, the battery cell may be configured to have a structure in which an electrode assembly is mounted in a pouch-shaped battery case formed of an aluminum laminate sheet. The secondary battery configured to have the above-described structure may be referred to as a pouch-shaped battery cell.

A unit module may be constituted by covering two or more battery cells with a high-strength cell cover, made of a synthetic resin or a metal material. The high-strength cell cover restrains the deformation of the battery cells due to repeated expansion and contraction of the battery cells during the charge and discharge of the battery cells, while protecting the battery cells having a low mechanical strength, thereby preventing the separation between the sealing regions of the battery cells. Eventually, therefore, it is possible to manufacture a middle or large-sized battery module having more excellent safety.

The battery cells are connected in series and/or parallel to each other in one unit module, or the battery cells of one unit module are connected in series and/or parallel to the battery cells of another unit module. In a preferred example, a plurality of unit modules may be manufactured by coupling electrode terminals of the battery cells to each other, while arranging the battery cells in series in the longitudinal direction, so that the electrode terminals of the battery cells are successively adjacent to each other, bending two or more battery cells by so that the battery cells are stacked, and covering a predetermined number of stacked battery cells with a cell cover.

The coupling between the electrode terminals may be achieved in various manners, such as welding, soldering and mechanical coupling. Preferably, the coupling between the electrode terminals is achieved by welding.

A plurality of battery cells or unit modules, stacked in high integration in a state in which the electrode terminals are connected to each other, are vertically mounted in the separable upper and lower cases that are configured to be coupled to each other, preferably, in the assembly-type coupling structure to constitute the rectangular battery module.

The details of a unit module and a rectangular battery module manufactured with a plurality of unit modules are disclosed in Korean Patent Application No. 2006-45443 and No. 2006-45444, which have been filed in the name of the applicant of the present application and the disclosure of which is incorporated herein by reference.

The middle or large-sized battery pack according to the present invention is preferably used as a power source for electric vehicles, hybrid electric vehicles or plug-in hybrid electric vehicles, the safety of which may seriously deteriorate due to high heat generated from a plurality of battery cells combined to provide high power and large capacity, during the charge and discharge of the battery cells.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 4:
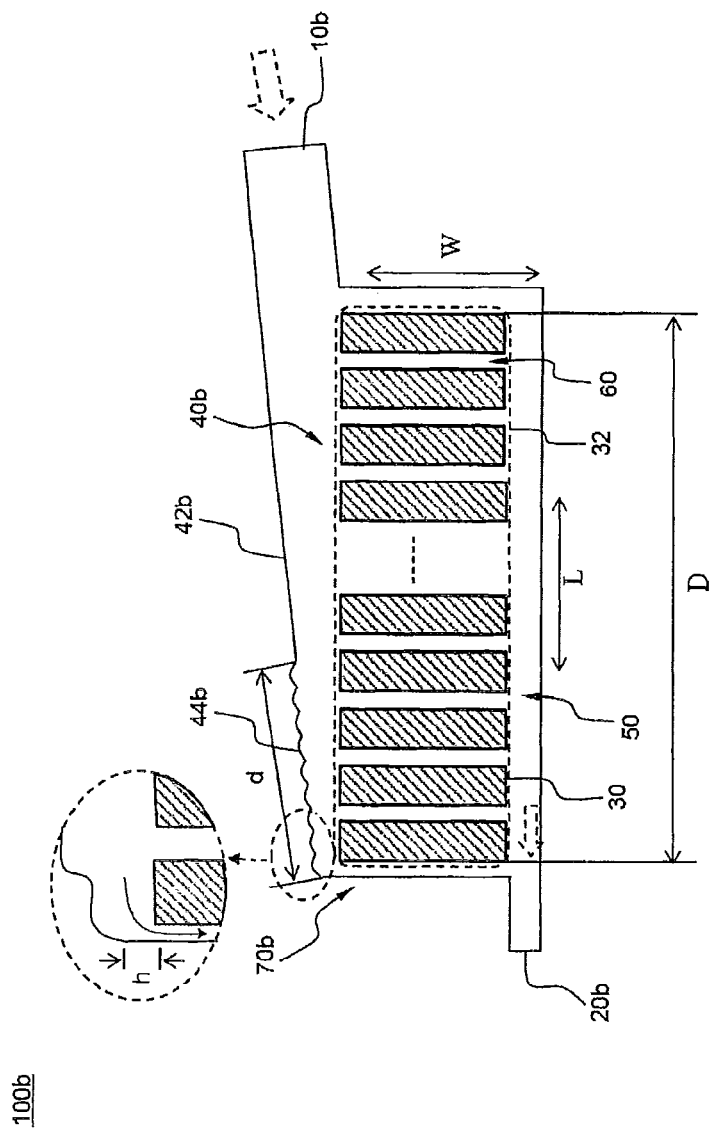
FIG. 4 is a vertical sectional view typically illustrating a middle or large-sized battery pack configured to have a structure in which a battery module is mounted in a battery pack case according to an embodiment of the present invention.

FIG. 4 is a vertical sectional view typically illustrating a middle or large-sized battery pack configured to have a structure in which a battery module is mounted in a battery pack case according to an embodiment of the present invention.

Figure 1:
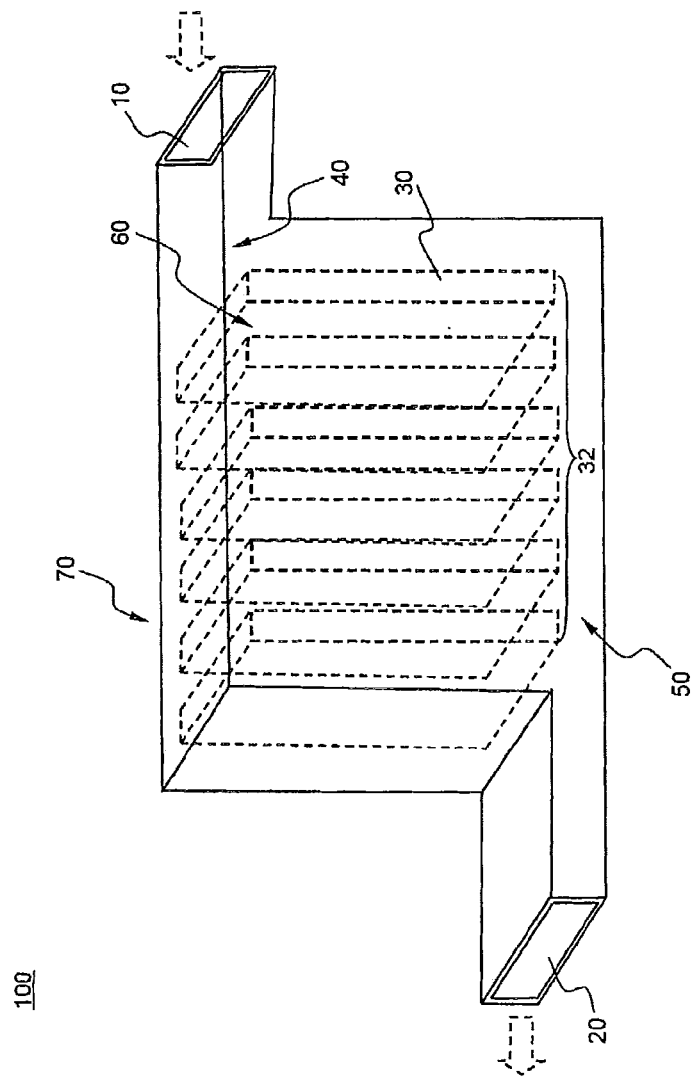
FIG. 1 is a perspective view illustrating a middle or large-sized battery pack configured to have a structure in which a battery module is mounted in a conventional middle or large-sized battery pack case.
Figure 2:
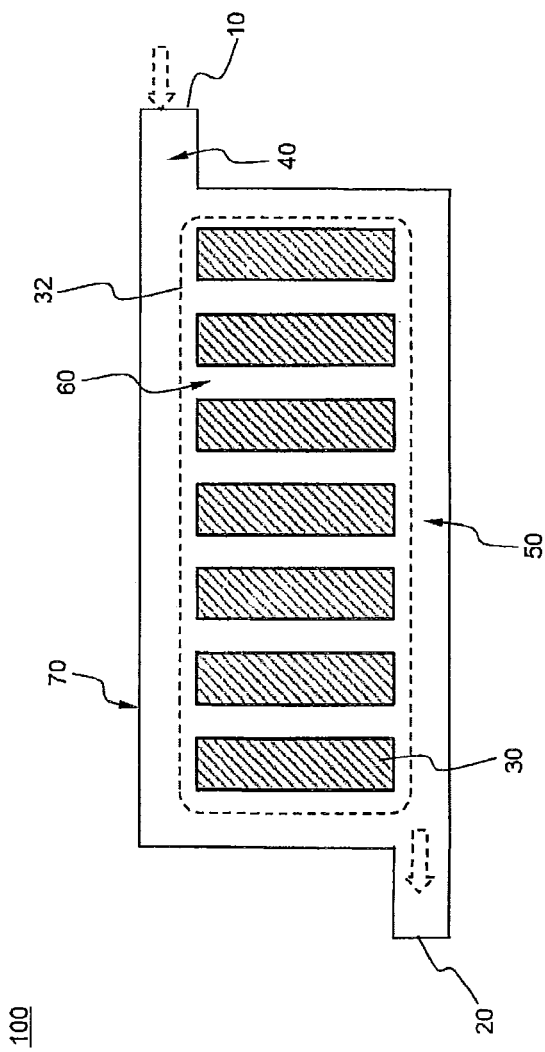
FIG. 2 is a vertical sectional view typically illustrating the middle or large-sized battery pack of FIG. 1.
Figure 3:
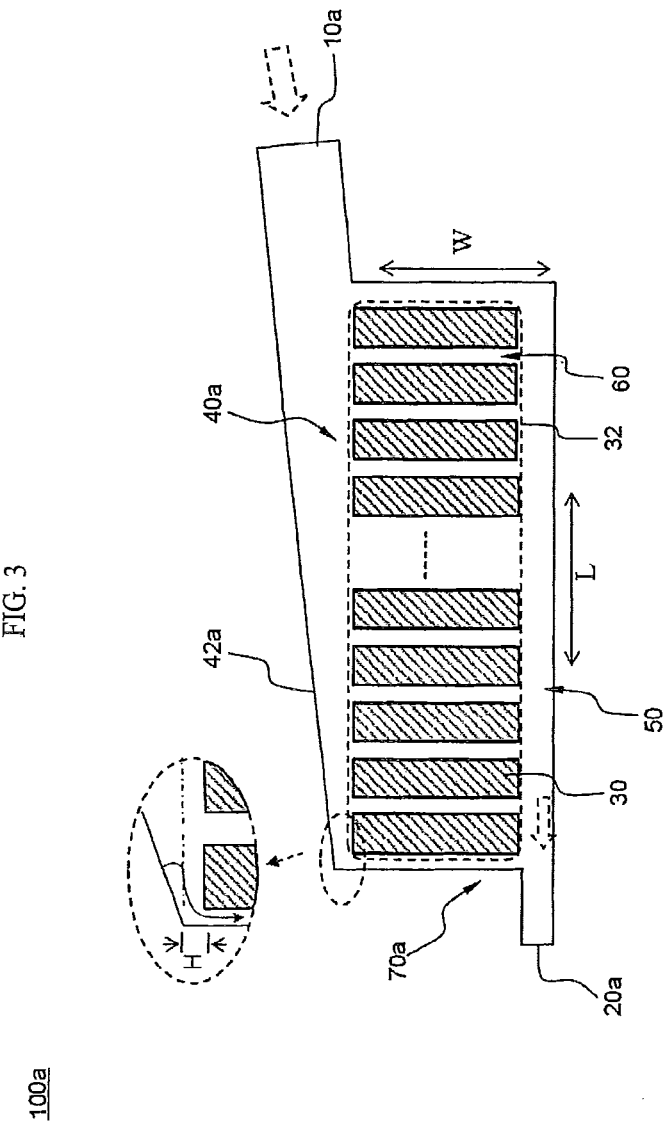
FIG. 3 is a vertical sectional view typically illustrating a middle or large-sized battery pack configured to have a structure in which a battery module is mounted in another conventional middle or large-sized battery pack case.

A middle or large-sized battery pack 100b of FIG. 4 is substantially identical to the middle or large-sized battery pack 100a of FIG. 3 in connection with the unit cells 30, the battery module 32, the coolant discharge part 50 and the flow channels 60. However, the middle or large-sized battery pack 100b of FIG. 4 is different from the middle or large-sized battery pack 100a of FIG. 3 in that a rugged portion 44b to eddy a coolant is formed at an upper end inside of a coolant introduction part 40b so that the rugged portion 44b extends a distance d equivalent to 35% of a length D of the top of the battery module 32 from an end of a battery pack case 70b opposite to a coolant inlet port 10b and the end of the battery pack case 70b opposite to the coolant inlet port 10b is spaced apart from the top of the battery module 32 by a height of approximately 5 mm.

In the structure of the battery pack case 70b, therefore, cooling efficiency is improved by eddy coolant. Also, since the end of the battery pack case 70b opposite to the coolant inlet port 10b is located higher than the end of the battery pack case of FIG. 3, noise and damage due to collision are minimized.

Figure 5:
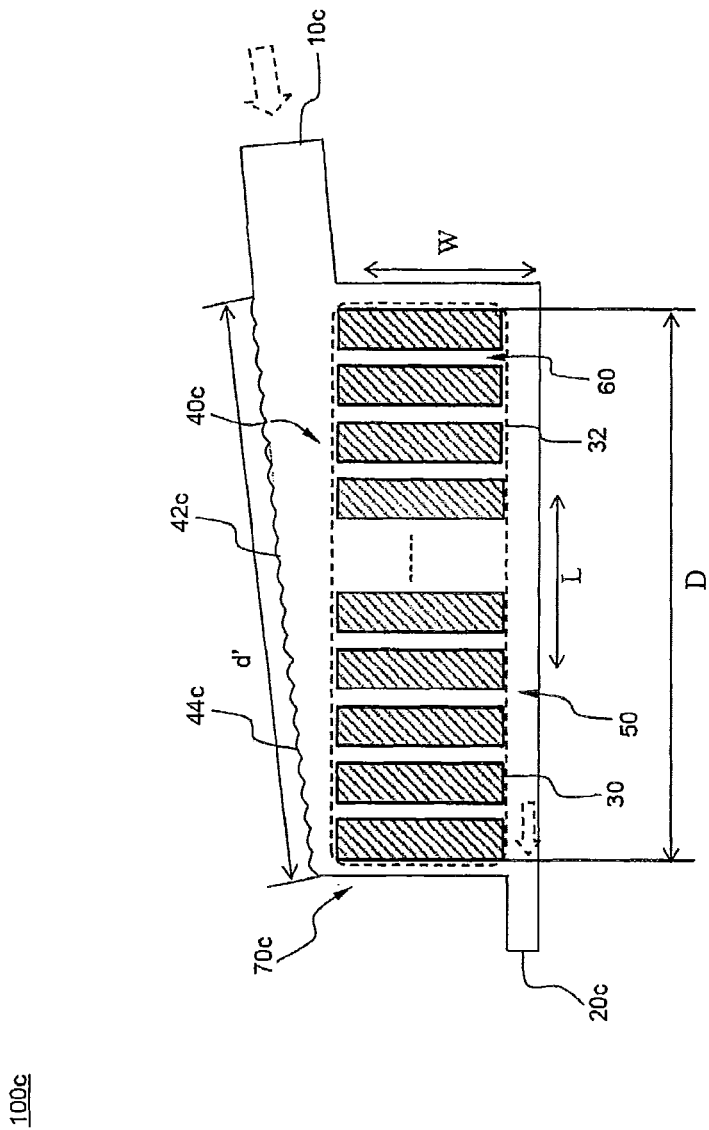
FIG. 5 is a vertical sectional view typically illustrating a middle or large-sized battery pack configured to have a structure in which a battery module is mounted in a battery pack case according to another embodiment of the present invention.

FIG. 5 is a vertical sectional view typically illustrating a middle or large-sized battery pack configured to have a structure in which a battery module is mounted in a battery pack case according to another embodiment of the present invention.

A middle or large-sized battery pack 100c of FIG. 5 is substantially identical to the middle or large-sized battery pack 100b of FIG. 4 in connection with the unit cells 30, the battery module 32, the coolant discharge part 50 and the flow channels 60. However, the middle or large-sized battery pack 100c of FIG. 5 is different from the middle or large-sized battery pack 100b of FIG. 4 in that a rugged portion 44c to eddy a coolant is formed at an upper end inside of a coolant introduction part 40b so that the rugged portion 44c extends a distance d' equivalent to 100% of a length D of the top of the battery module 32 from an end of a battery pack case 70c opposite to a coolant inlet port 10b.

Figure 6:
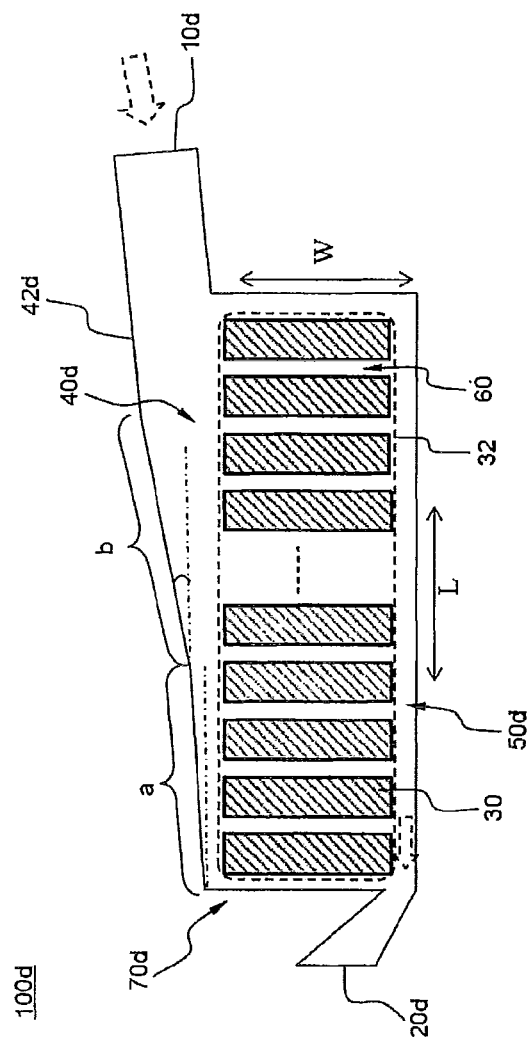
FIG. 6 is a vertical sectional view typically illustrating a middle or large-sized battery pack configured to have a structure in which a battery module is mounted in a battery pack case according to another embodiment of the present invention.

FIG. 6 is a vertical sectional view typically illustrating a middle or large-sized battery pack configured to have a structure in which a battery module is mounted in a battery pack case according to another embodiment of the present invention.

Referring to FIG. 6, a battery pack case 70d is configured to have a structure in which the length of the battery pack case 70d corresponding to the stacking direction L of unit cells 30 is greater than that of the battery pack case 70d corresponding to the lateral direction W of the unit cells 30. Also, a coolant inlet port 10d and a coolant outlet port 20d are formed at the upper part and the lower part of the battery pack case 70d, respectively, in opposite directions so that a coolant can flow from one side to the other side of the battery module 32 in the direction perpendicular to the stacking direction L of the battery cells 30.

Small flow channels 60 are defined between the respective unit cells 30 so that the coolant can flow through the flow channels 60. Consequently, the coolant, introduced through the coolant inlet port 10d, flows through the flow channels 60. At this time, heat generated from the unit cells 30 is removed by the coolant. After that, the coolant is discharged to the outside through the coolant outlet port 20d.

The battery pack case 70d of FIG. 6 is different from the battery pack case 70a illustrated in FIG. 3 in that an upper end inside 42d of the coolant introduction part 40d of the battery pack case 70d of the FIG. 6 is configured in the form of an incline plane having an inclination increasing in stages. That is, the upper end inside 42d of the coolant introduction part 40d is configured to have a structure in which the inclination of the incline plane starting from the end of the battery pack case 70d opposite to the coolant inlet port 10d increases toward the coolant inlet port 10d from the top of the battery module 32. Specifically, the upper end inside 42d of the coolant introduction part 40d includes a first incline plane a starting from the end of the battery pack case 70d opposite to the coolant inlet port 10d and a second incline plane b located between the first incline plane a and the coolant inlet port 10d so that the second incline plane b has an inclination greater than that of the first incline plane a.

When the coolant, introduced through the coolant inlet port 10d, flows through the coolant introduction part 40d along the first incline plane a and the second incline plane b, the flow sectional area of the coolant is gradually decreased by the incline planes a and b of which the inclination decreases according to the increase of the distance from the coolant inlet port 10d. As a result, the flow speed of the coolant gradually increases but the coolant flux decreases, and therefore, a uniform coolant flux is introduced into the respective flow channels 60 while the coolant reaches the unit cells 30 distant from the coolant inlet port 10d.

In order to increase distribution uniformity of the coolant, the first incline plane a and the second incline plane b are formed at the upper end inside 42d of the coolant introduction part 40d so that the first incline plane a has an inclination of approximately 5 degrees with respect to the top of the battery module 32 and the second incline plane b has an inclination 200% greater than the inclination of the first incline plane a, i.e. an inclination of approximately 10 degrees with respect to the top of the battery module 32.

Meanwhile, as shown in FIG. 6, the coolant inlet port 10d has an inclination less than that of the second incline plane b.

Consequently, as the coolant, introduced through the coolant inlet port 10*d*, passes through a point at which the second incline plane b starts, the flow speed of the coolant gradually increases until the coolant reaches the end of the battery pack case 70*d* opposite to the coolant inlet port 10*b*. As a result, not only the unit cells 30 adjacent to the coolant inlet port 10*b* but also the unit cells 30 distant from the coolant inlet port 10*b* are uniformly cooled.

Also, the battery pack case 70*d* is configured to have a structure in which the coolant introduction part 40*d* is inclined in stages so that the inclination of the coolant introduction part 40*d* gradually decreases toward the end of the battery pack case 70*d* opposite to the coolant inlet port 10*d*. Consequently, it is possible to prevent the occurrence of a phenomenon in which the coolant flux concentrates on the coolant outlet port 20*d* side, and therefore, it is possible to prevent the increase in temperature of the unit cells 30 adjacent to the coolant inlet port 10*d*.

In the above structure, if the end of the battery pack case opposite to the coolant inlet port is low, temperature deviation between the unit cells is high. If the end of the battery pack case opposite to the coolant inlet port is too low, however, the upper end inside of the coolant introduction part comes into contact with the battery module with the result that the battery module and the battery pack case may be damaged. On the other hand, if the end of the battery pack case opposite to the coolant inlet port is too high, it is not possible to achieve desired distribution uniformity of the coolant.

Figure 7:
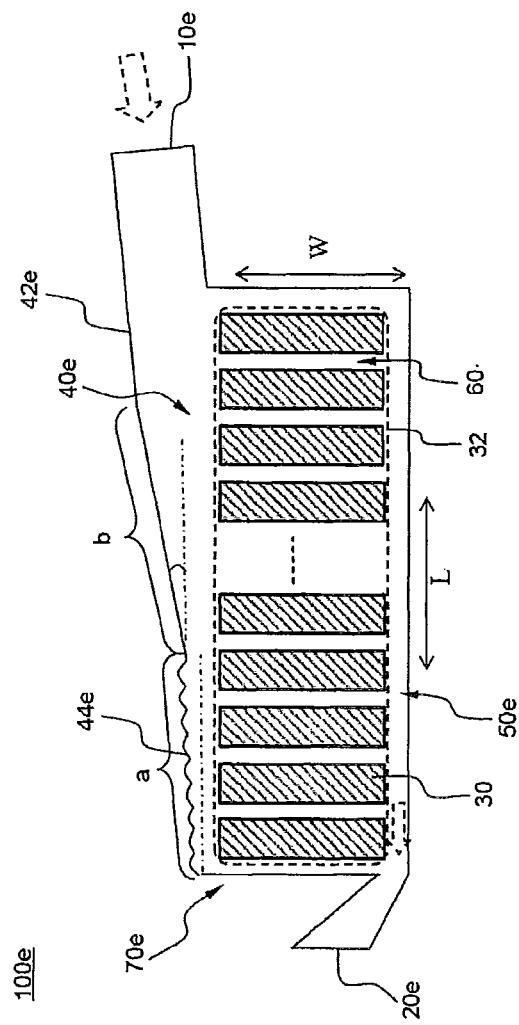
FIGS. 7 and 8 are vertical sectional views typically illustrating middle or large-sized battery packs configured so that battery modules are mounted in battery pack cases according to various embodiments of the present invention.
Figure 8:
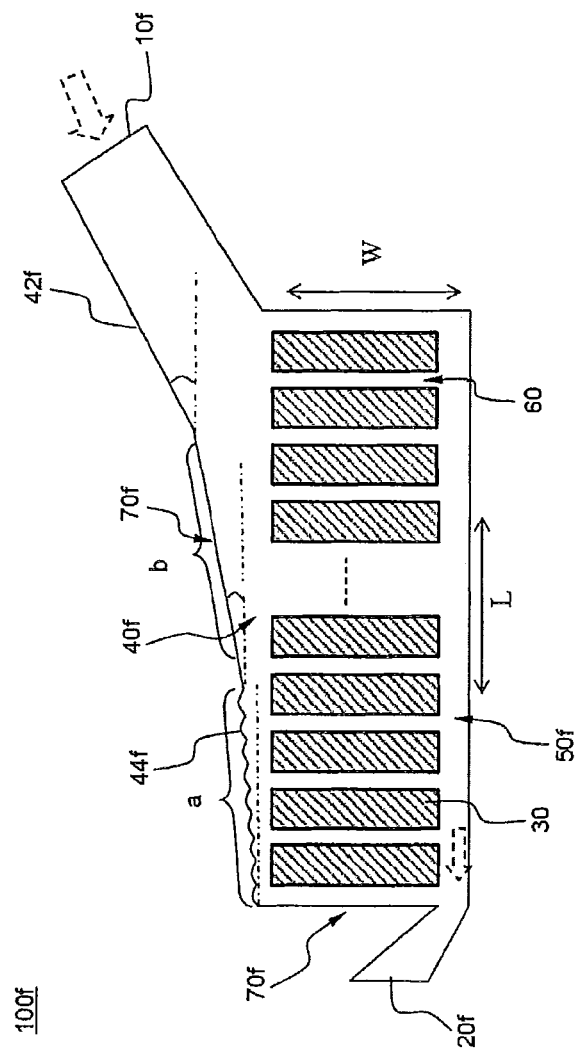

FIGS. 7 and 8 are vertical sectional views typically illustrating middle or large-sized battery packs configured so that battery modules are mounted in battery pack cases according to various embodiments of the present invention.

A middle or large-sized battery pack 100*e* of FIG. 7 is substantially identical to the middle or large-sized battery pack 100*d* of FIG. 6 in connection with the unit cells 30, the battery module 32, the coolant discharge part 50 and the flow channels 60. However, the middle or large-sized battery pack 100*e* of FIG. 7 is different from the middle or large-sized battery pack 100*d* of FIG. 6 in that a rugged portion 44*e* to eddy a coolant is formed at an upper end inside of the first incline plane a.

A middle or large-sized battery pack 100*f* of FIG. 8 is identical to the middle or large-sized battery pack 100*e* of FIG. 7 except that a coolant inlet port 10*f* is inclined at an angle of 30 degrees, which is greater than the inclination of the second incline plane b, which is 10 degrees.

However, uniform distribution of the coolant is little affected by the inclination of the coolant inlet port 10*f*. Consequently, the inclination of the coolant inlet port 10*f* may be changed based on the structure of a device in which the battery pack is installed without reduction of cooling efficiency.

Figure 9:
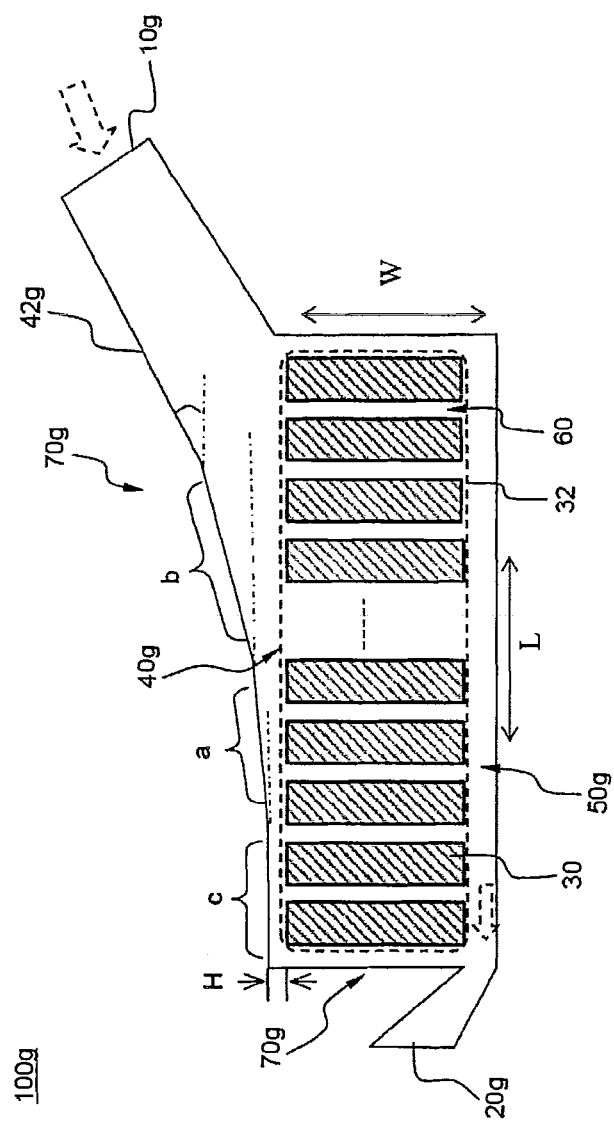
FIG. 9 is a vertical sectional view typically illustrating a middle or large-sized battery pack configured to have a structure in which a battery module is mounted in a battery pack case according to another embodiment of the present invention.

FIG. 9 is a vertical sectional view typically illustrating a middle or large-sized battery pack configured to have a structure in which a battery module is mounted in a battery pack case according to another embodiment of the present invention.

In a battery pack case 70*g* of FIG. 9, an upper end inside 42*g* of a coolant introduction part 40*g* includes a first parallel plane c, having a predetermined height h, formed at an end of the battery pack case 70*g* opposite to a coolant inlet port 10*g* so that the first parallel plane c is parallel to the top of a battery module 32, a first incline plane a starting from one end of the first parallel plane c and a second incline plane b located between the first incline plane a and the coolant inlet port 10*g* so that the second incline plane b has an inclination greater than that of the first incline plane a.

In order to increase distribution uniformity of a coolant, the first parallel plane c, the first incline plane a and the second incline plane b are formed at the upper end inside 42*g* of the coolant introduction part 40*g* so that the first parallel plane c has an inclination of 0 degrees with respect to the top of the battery module 32, the first incline plane a has an inclination of approximately 5 degrees with respect to the top of the battery module 32 and the second incline plane b has an inclination of approximately 10 degrees with respect to the top of the battery module 32.

Also, the coolant inlet port 10*g* is inclined at an angle of 30 degrees, which is greater than the inclination of the second incline plane b, which is 10 degrees.

Figure 10:
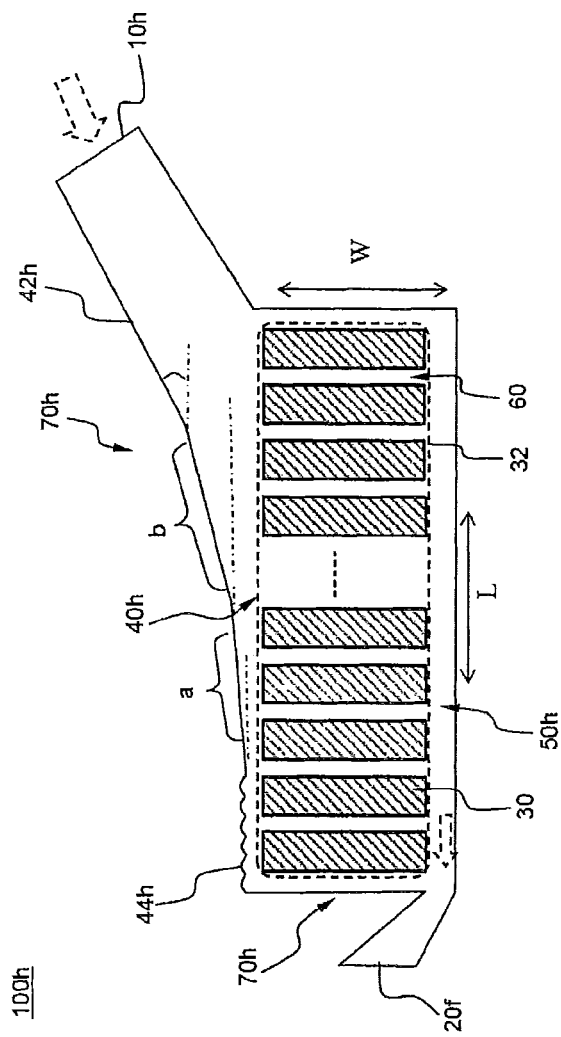
FIG. 10 is a vertical sectional view typically illustrating a middle or large-sized battery pack configured to have a structure in which a battery module is mounted in a battery pack case according to another embodiment of the present invention.

FIG. 10 is a vertical sectional view typically illustrating a middle or large-sized battery pack configured to have a structure in which a battery module is mounted in a battery pack case according to another embodiment of the present invention.

A middle or large-sized battery pack 100*h* of FIG. 10 is substantially identical to the middle or large-sized battery pack 100*g* of FIG. 9 in connection with the unit cells 30, the battery module 32, the coolant discharge part 50 and the flow channels 60. However, the middle or large-sized battery pack 100*h* of FIG. 10 is different from the middle or large-sized battery pack 100*g* of FIG. 9 in that a rugged portion 44*h* to eddy a coolant is formed throughout an upper end inside of the first parallel plane c.

Figure 11:
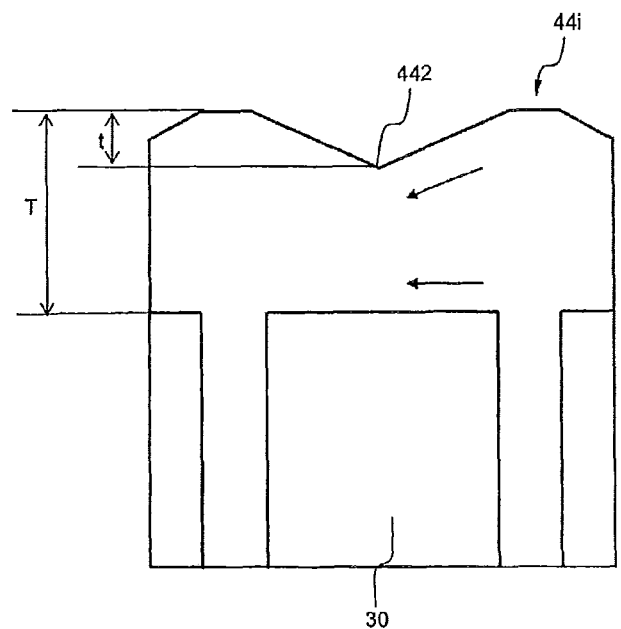
FIGS. 11 to 13 are partial vertical sectional views typically illustrating various embodiments of a rugged portion shown in FIG. 10.
Figure 12:
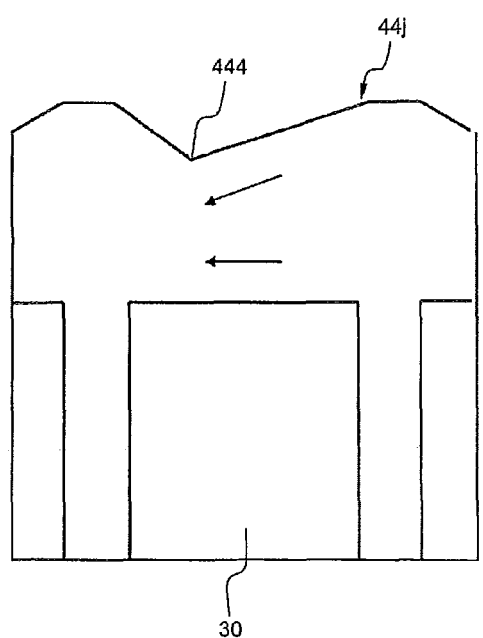
Figure 13:
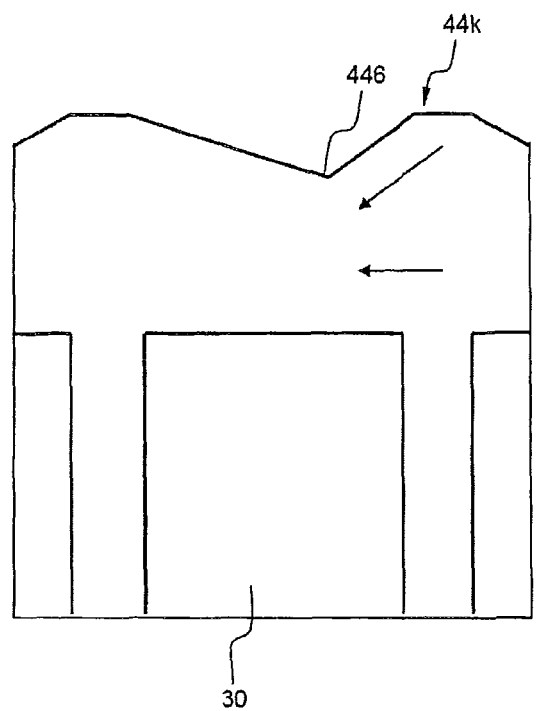

FIGS. 11 to 13 are partial vertical sectional views typically illustrating various embodiments of the rugged portion shown in FIG. 10.

Referring to these drawings together with FIG. 10, rugged portions 44*i*, 44*j* and 44*k* each have a height t equivalent to 20% of a height T of the end of the battery pack case opposite to the coolant inlet port 10*h*. The respective rugged portions 44*i*, 44*j* and 44*k* are formed in the shape of downwardly depressed beads.

In FIG. 11, each lowest point 442 of the rugged portion 44*i* is located above the center of the top of a corresponding one of the unit cells 30. In FIG. 12, each lowest point 444 of the rugged portion 44*j* is located above the rear side of the top of a corresponding one of the unit cells 30 in the flow direction of the coolant. In FIG. 13, each lowest point 446 of the rugged portion 44*k* is located above the front side of the top of a corresponding one of the unit cells 30 in the flow direction of the coolant.

Figure 14:
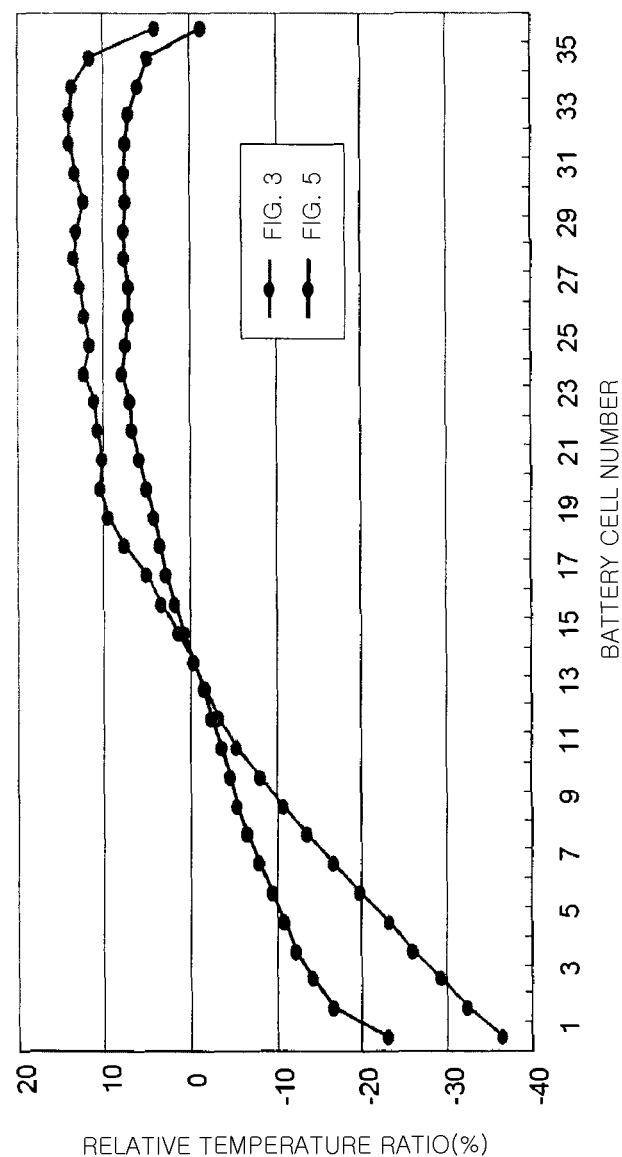
FIG. 14 is a graph illustrating the measurement results of the change in temperature of battery cells in the middle or large-sized battery packs of FIGS. 3 and 5.

In connection with the above description, FIG. 14 is a graph illustrating the measurement results of the change in temperature of the battery cells in the middle or large-sized battery packs of FIGS. 3 and 5.

Referring to FIG. 14 together with FIGS. 3 and 5, FIG. 14 illustrates measurement results of the temperature of the battery cells stacked in the battery pack case from the battery cell adjacent to the coolant outlet port to the battery cell adjacent to the coolant inlet port. That is, battery cell number 1 indicates the battery cell adjacent to the coolant outlet port and battery cell number 35 indicates the battery cell adjacent to the coolant inlet port.

The temperature measurement experiments were carried out under a condition in which a predetermined load was applied to the battery cells and external temperature was maintained at a level of room temperature. For the battery pack of FIG. 3, the measurement experiments revealed that battery cell number 1, i.e. the battery cell adjacent to the end of the batter pack case opposite to the coolant inlet port, had a relative temperature ratio of −36%, battery cell number 35 had a relative temperature ratio of 3% and battery cell number 33 had a relative temperature ratio of 14%, which was the maximum. That is, the temperature deviation between the battery cells was 50%. When the temperature of a battery cell exceeds a specific temperature level, the life span of the battery cell abruptly decreases. Such high temperature and high temperature deviation make it impossible to use the battery pack for a long period of time and, in addition, a possibility that the battery pack will explode increases.

For reference, the above-mentioned relative temperature ratio of the battery cells was expressed as relative values that are comparable in relation to the experiment results of the battery pack shown in FIG. 5, which will be described hereinafter. Also, relative temperature ratio deviation between the battery cells means that temperature deviation between the battery cells occurs.

On the other hand, for the battery pack of FIG. 5, the measurement experiments revealed that battery cell number 1 had a relative temperature ratio of −23%, battery cell number 35 had a relative temperature ratio of −2% and battery cell number 31 had a relative temperature ratio of 8%, which was the maximum. Consequently, it can be seen that it is possible to reduce the temperature deviation from 50% to 31% as compared with the battery pack of FIG. 3, thereby greatly improving temperature distribution uniformity of the coolant.

The reason that the temperature deviation is reduced is that, as described above, the rugged portion eddies a coolant to prevent the coolant from concentrating on the coolant outlet port side.

Figure 15:
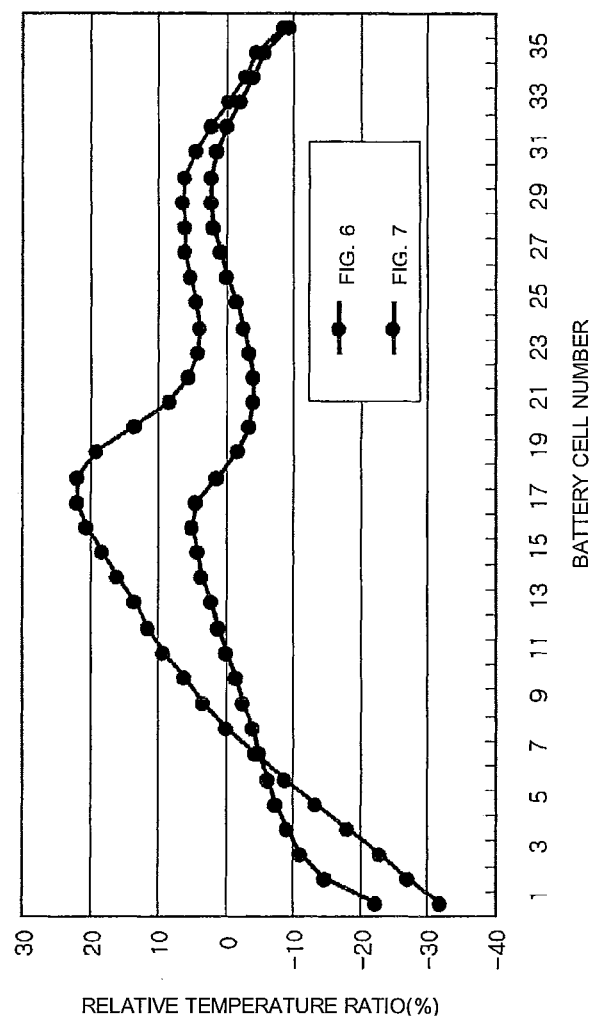
FIG. 15 is a graph illustrating the measurement results of the change in temperature of battery cells in the middle or large-sized battery packs of FIGS. 6 and 7.

FIG. 15 is a graph illustrating the measurement results of the change in temperature of battery cells in the middle or large-sized battery packs of FIGS. 6 and 7.

For the battery pack of FIG. 6, the measurement experiments revealed that battery cell number 1, i.e. the battery cell adjacent to the end of the batter pack case opposite to the coolant inlet port, had a relative temperature ratio of −32%, battery cell number 35 had a relative temperature ratio of 2% and battery cell number 18 had a relative temperature ratio of 21%, which was the maximum. That is, the temperature deviation between the battery cells was 53%.

On the other hand, for the battery pack of FIG. 7, the measurement experiments revealed that battery cell number 1 had a relative temperature ratio of −22%, battery cell number 35 had a relative temperature ratio of 2% and battery cell number 15 had a relative temperature ratio of 5%, which was the maximum. Consequently, it can be seen that it is possible to reduce the temperature deviation from 53% to 27% as compared with the battery pack of FIG. 6.

Figure 16:
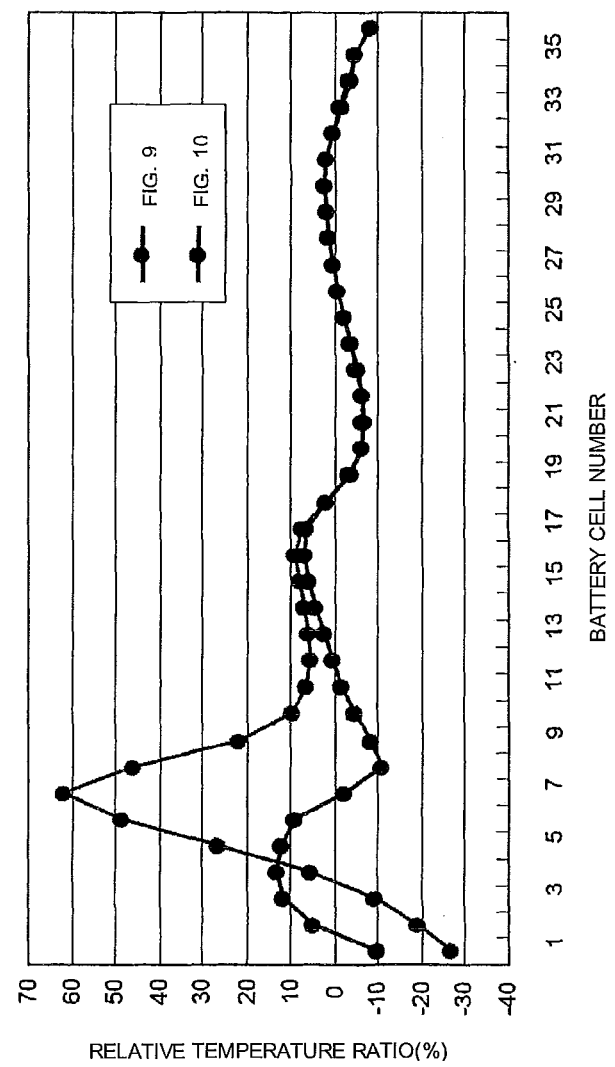
FIG. 16 is a graph illustrating the measurement results of the change in temperature of battery cells in the middle or large-sized battery packs of FIGS. 9 and 10.

FIG. 16 is a graph illustrating the measurement results of the change in temperature of battery cells in the middle or large-sized battery packs of FIGS. 9 and 10.

For the battery pack of FIG. 9, the measurement experiments revealed that battery cell number 1, i.e. the battery cell adjacent to the end of the batter pack case opposite to the coolant inlet port, had a relative temperature ratio of −28%, battery cell number 35 had a relative temperature ratio of −9% and battery cell number 7 had a relative temperature ratio of 62%, which was the maximum. That is, the temperature deviation between the battery cells was 90%.

On the other hand, for the battery pack of FIG. 10, the measurement experiments revealed that battery cell number 1 had a relative temperature ratio of −10%, battery cell number 35 had a relative temperature ratio of −9% and battery cell number 3 had a relative temperature ratio of 13%, which was the maximum. Consequently, it can be seen that it is possible to greatly reduce the temperature deviation from 90% to 23% as compared with the battery pack of FIG. 9.

That is, if the end of the battery pack case opposite to the coolant inlet port 10g has a predetermined height H and the first parallel plane has an inclination of 0 degrees as shown in FIG. 9, the coolant concentrate on the end of the battery pack case opposite to the coolant inlet port 10g, which increases a relative temperature ratio. On the other hand, if the rugged portion 44h is formed at the first parallel plane c as shown in FIG. 10, the rugged portions 44h eddies a coolant with the result that the coolant is prevented from concentrating on the end of the battery pack case opposite to the coolant inlet port 10h, which greatly decreases temperature deviation.

Figure 17:
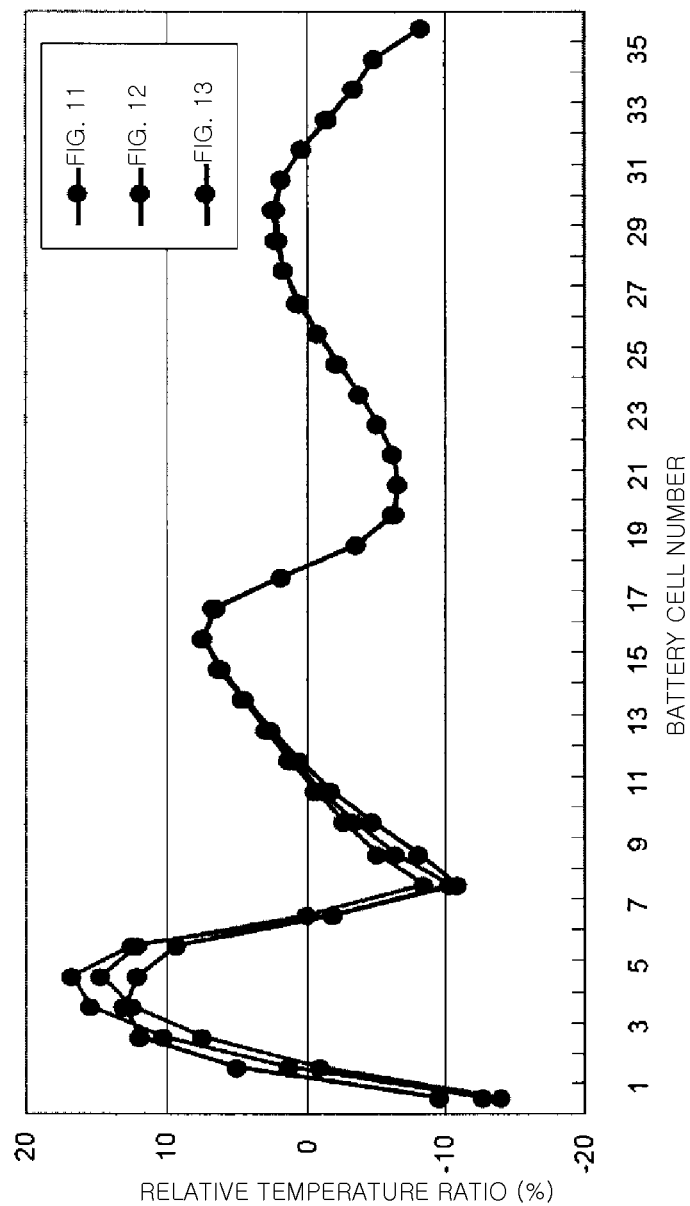
FIG. 17 is a graph illustrating the measurement results of the change in temperature of battery cells in the middle or large-sized battery packs configured to have the rugged portions of FIGS. 11 to 13.

FIG. 17 is a graph illustrating the measurement results of the change in temperature of battery cells in the middle or large-sized battery packs configured to have the rugged portions of FIGS. 11 to 13.

The experiments in connection with FIG. 17 were carried out under the same conditions as in FIG. 16 except that positions of the lowest points of the rugged portions are different from each other as shown in FIGS. 11 to 13. It can be seen from FIG. 17 that, if each lowest point 446 of the rugged portion is located above the front side of a corresponding one of the unit cells 30 in the flow direction of the coolant as shown in FIG. 13, temperature deviation between the battery cells 30 is relatively low.

Figure 18:
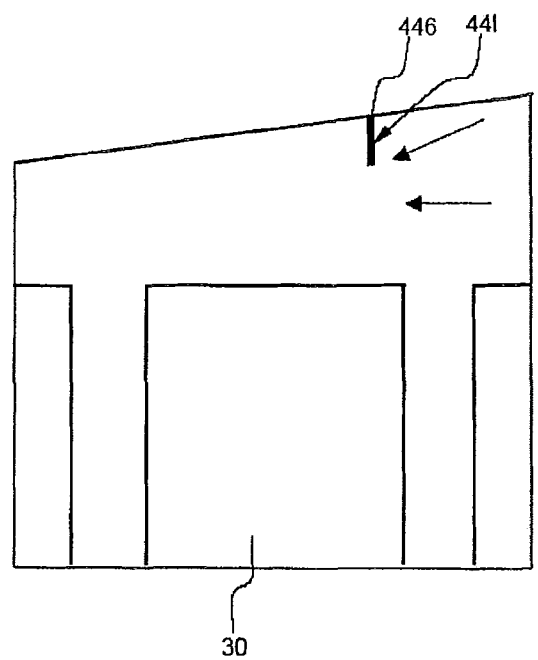
FIG. 18 is a partial typical view illustrating a structure in which partitions are formed in the middle or large-sized battery pack of FIG. 6.

FIG. 18 is a partial typical view illustrating a structure in which partitions are formed in the middle or large-sized battery pack of FIG. 6.

Figure 19:
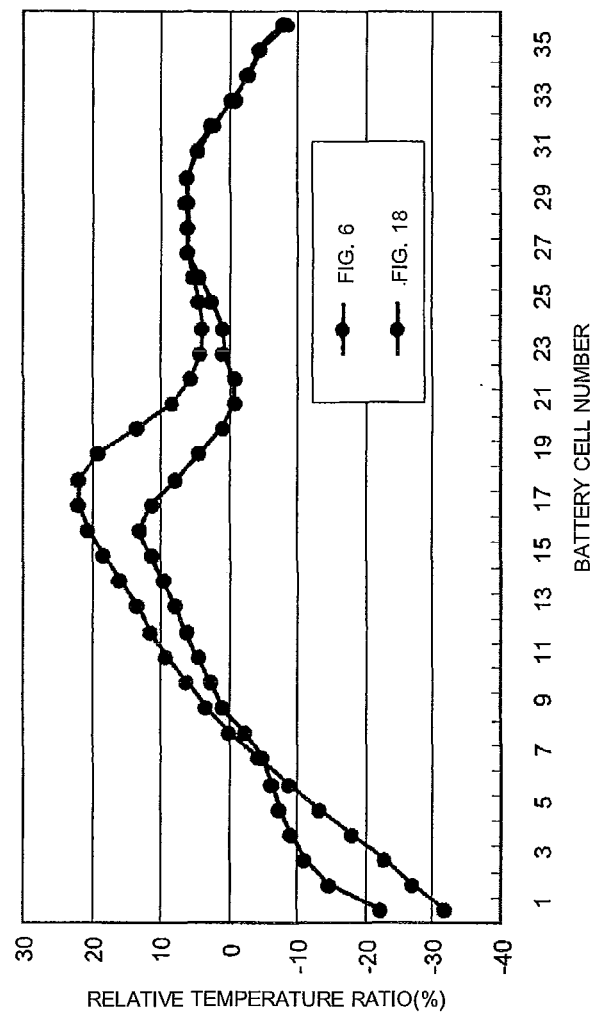
FIG. 19 is a graph illustrating the measurement results of the change in temperature of battery cells in the middle or large-sized battery packs of FIGS. 6 and 18.

Referring to FIG. 19 together with FIG. 6, each partition 441 is located above the front side of a corresponding one of the unit cells 30 in the flow direction of the coolant. Also, each partition 441 is formed at the upper end inside of the coolant introduction part 40d so that each partition 441 extends downward.

FIG. 19 is a graph illustrating the measurement results of the change in temperature of battery cells in the middle or large-sized battery packs of FIGS. 6 and 18.

For the battery pack of FIG. 6, the measurement experiments revealed that the temperature deviation between the battery cells was 53% as mentioned above.

On the other hand, for the battery pack of FIG. 18, the measurement experiments revealed that battery cell number 1 had a relative temperature ratio of −22%, battery cell number 35 had a relative temperature ratio of 2% and battery cell number 15 had a relative temperature ratio of 12%, which was the maximum. Consequently, it can be seen that it is possible to reduce the temperature deviation from 53% to 34% as compared with the battery pack of FIG. 6.

Figure 20:
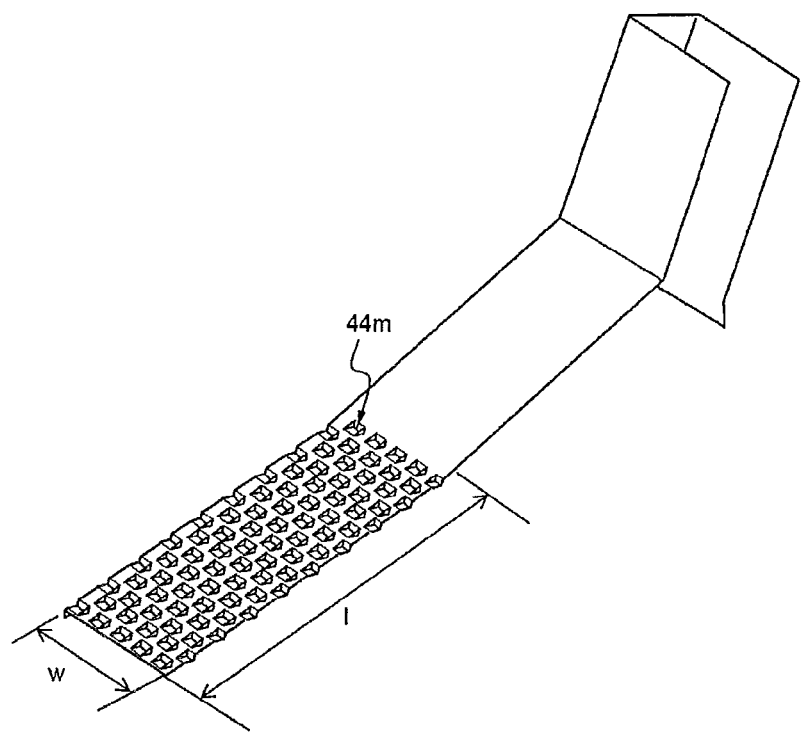
FIG. 20 is a partial typical view illustrating a structure in which downward protrusions having a specific shape are formed.

FIG. 20 is a partial typical view illustrating a structure in which downward protrusions having a specific shape are formed.

Referring to FIG. 20 together with FIG. 8, downward protrusions 44m having a specific shape are formed at the battery pack 100f of FIG. 8 instead of the rugged portion 44f. The downward protrusions 44m are formed so that the downward protrusions 44m are arranged discontinuously in the lateral direction w of the coolant introduction part 40f and arranged alternately in the longitudinal direction 1 of the coolant introduction part 40f.

Figure 21:
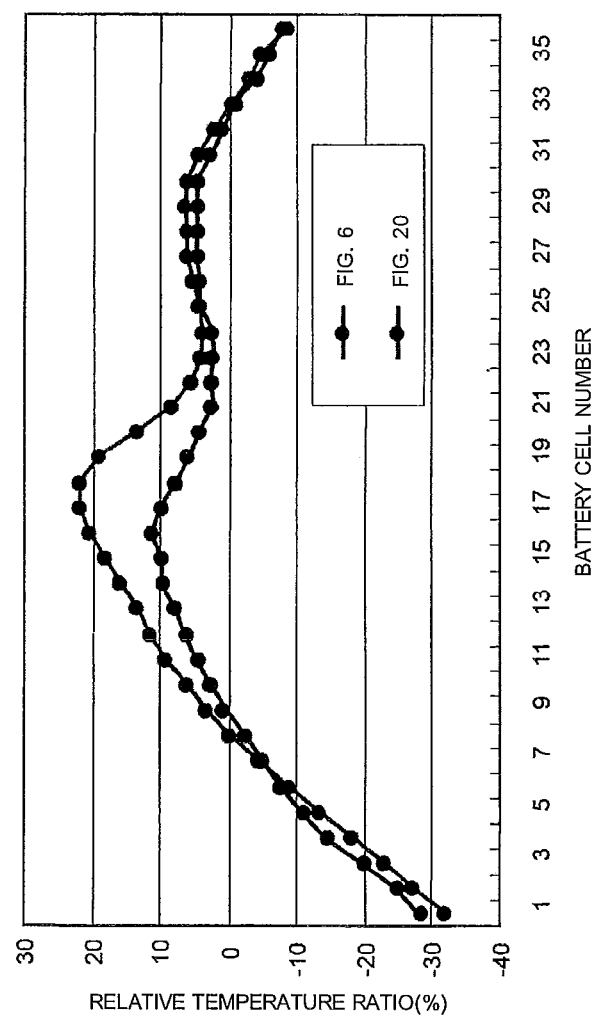
FIG. 21 is a graph illustrating the measurement results of the change in temperature of battery cells in the middle or large-sized battery packs of FIGS. 6 and 20.

FIG. 21 is a graph illustrating the measurement results of the change in temperature of battery cells in the middle or large-sized battery packs of FIGS. 6 and 20.

For the battery pack of FIG. 6, the measurement experiments revealed that the temperature deviation between the battery cells was 53% as mentioned above.

On the other hand, for the battery pack of FIG. 20, the measurement experiments revealed that battery cell number 1 had a relative temperature ratio of −28%, battery cell number 35 had a relative temperature ratio of 2% and battery cell number 16 had a relative temperature ratio of 10%, which was the maximum. Consequently, it can be seen that it is possible to reduce the temperature deviation from 53% to 38% as compared with the battery pack of FIG. 6.

INDUSTRIAL APPLICABILITY

As is apparent from the above description, the middle or large-sized battery pack case according to the present invention is configured to have a structure in which the downwardly projected portion to guide the coolant is formed at the upper end inside of the coolant introduction part so that the downwardly projected portion is arranged a predetermined distance from the end of the battery pack case opposite to the coolant inlet port. Consequently, it is possible to uniformly distribute the coolant flowing in the flow channels defined between the battery cells while maintaining the end of the battery pack case opposite to the coolant inlet port to a proper height or higher, thereby effectively removing heat accumulating between the battery cells and greatly improving the performance and life span of the battery cells.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack case in which a battery module having a plurality of stacked battery cells or unit modules ('unit cells'), which can be charged and discharged, is mounted, wherein
the battery pack case is provided at an upper part and a lower part thereof with a coolant inlet port and a coolant outlet port, respectively, which are directed in opposite directions such that a coolant to cool the unit cells can flow from one side to the other side of the battery module in the direction perpendicular to the stacking direction of the unit cells,
the battery pack case is further provided with a flow space ('coolant introduction part') extending from the coolant inlet port to the battery module and another flow space ('coolant discharge part') extending from the battery module to the coolant outlet port,
an upper end inside of the coolant introduction part facing the top of the battery module is configured so that the distance between the upper end inside of the coolant introduction part and the top of the battery module decreases toward an end of the battery pack case opposite to the coolant inlet port,
a downwardly projected portion to guide the coolant to the battery module is formed at the upper end inside of the coolant introduction part so that a rugged portion extends a predetermined distance from the end of the battery pack case opposite to the coolant inlet port, and
the upper end inside of the coolant introduction part comprises two or more continuous incline planes, in which the inclination of the two or more incline planes starting from the end of the battery pack case opposite to the coolant inlet port increases toward the coolant inlet port from the top of the battery module.

2. The battery pack case according to claim 1, wherein the downwardly projected portion comprises the rugged portion to eddy the coolant.

3. The battery pack case according to claim 2, wherein the rugged portion has a height equivalent to 10 to 50% of that of the end of the battery pack case opposite to the coolant inlet port.

4. The battery pack case according to claim 2, wherein the rugged portion has lowest points, each of which is located above the center, the front side or the rear side of the top of a corresponding one of the unit cells.

5. The battery pack case according to claim 4, wherein the rugged portion has lowest points, each of which is located above the front side of the top of a corresponding one of the unit cells.

6. The battery pack case according to claim 2, wherein the rugged portion is formed in the shape of downwardly protruding or depressed beads or hemispheres.

7. The battery pack case according to claim 6, wherein the rugged portion comprises downward depressions.

8. The battery pack case according to claim 1, wherein the downwardly projected portion comprises partitions.

9. The battery pack case according to claim 1, wherein the downwardly projected portion comprises downward protrusions arranged discontinuously in the lateral direction of the coolant introduction part and arranged alternately in the longitudinal direction of the coolant introduction part.

10. The battery pack case according to claim 1, wherein the downwardly projected portion extends a distance equivalent to 5 to 100% of the length of the top of the battery module from the end of the battery pack case opposite to the coolant inlet port.

11. The battery pack case according to claim 1, wherein the incline planes of the upper end inside comprise a first incline plane starting from the end of the battery pack case opposite to the coolant inlet port and a second incline plane located between the first incline plane and the coolant inlet port so that the second incline plane has an inclination greater than that of the first incline plane.

12. The battery pack case according to claim 11, wherein the downwardly projected portion is formed wholly or partially at the first incline plane.

13. The battery pack case according to claim 1, wherein the incline planes of the upper end inside comprise a first parallel plane extending from the end of the battery pack case opposite to the coolant inlet port so that the first parallel plane is parallel to the top of the battery module, a first incline plane starting from the first parallel plane and a second incline plane located between the first incline plane and the coolant inlet port so that the second incline plane has an inclination greater than that of the first incline plane.

14. The battery pack case according to claim 13, wherein the downwardly projected portion is formed wholly or partially at the first parallel plane.

15. The battery pack case according to claim 11, wherein the second incline plane has an inclination 20 to 500% greater than the inclination of the first incline plane within a range in which the inclination of the second incline plane does not exceed 45 degrees with respect to the top of the battery module.

16. The battery pack case according to claim 11, wherein the first incline plane has an inclination of 15 degrees or less with respect to the top of the battery module.

17. The battery pack case according to claim 11, wherein the second incline plane has an inclination of 10 to 30 degrees or less with respect to the top of the battery module within a range in which the inclination of the second incline plane exceeds that of the first incline plane.

18. The battery pack case according to claim 11, wherein the coolant inlet port has an inclination equal to or less than that of the second incline plane.

19. The battery pack case according to claim 11, wherein the coolant inlet port has an inclination equal to or greater than that of the second incline plane.

20. The battery pack case according to claim 1, wherein the end of the battery pack case opposite to the coolant inlet port is spaced apart from the top of the battery module by a height equivalent to 2 to 30% of that of the battery module.

21. The battery pack case according to claim 20, wherein the end of the battery pack case opposite to the coolant inlet port is spaced apart from the top of the battery module by a height of 3 to 20 mm.

22. The battery pack case according to claim 1, wherein the battery pack case is configured so that the length of the battery pack case in the stacking direction of the unit cells is greater than that of the battery pack case in the lateral direction of the unit cells.

23. The battery pack case according to claim 1, wherein the coolant discharge part has a uniform height with respect to the bottom of the battery module.

24. The battery pack case according to claim 1, wherein the battery pack case is configured so that a blowing fan is further mounted in the coolant inlet port or the coolant outlet port to move the coolant, introduced through the coolant inlet port, to the coolant outlet port, after the coolant flows through the battery module.

25. A battery pack configured to have a structure in which a battery module is mounted in a battery pack case according to claim 1.

26. The battery pack according to claim 25, wherein the battery pack is used as a power source for electric vehicles, hybrid electric vehicles or plug-in hybrid electric vehicles.

27. The battery pack case according to claim 13, wherein the second incline plane has an inclination 20 to 500% greater than the inclination of the first incline plane within a range in which the inclination of the second incline plane does not exceed 45 degrees with respect to the top of the battery module.

28. The battery pack case according to claim 13, wherein the first incline plane has an inclination of 15 degrees or less with respect to the top of the battery module.

29. The battery pack case according to claim 13, wherein the second incline plane has an inclination of 10 to 30 degrees or less with respect to the top of the battery module within a range in which the inclination of the second incline plane exceeds that of the first incline plane.

30. The battery pack case according to claim 13, wherein the coolant inlet port has an inclination equal to or less than that of the second incline plane.

31. The battery pack case according to claim 13, wherein the coolant inlet port has an inclination equal to or greater than that of the second incline plane.

32. The battery pack case according to claim 1, wherein one incline plane of the two or more incline planes closer to the coolant inlet port than another of the two or more incline planes has a greater angle of inclination than said another incline plane.

* * * * *